US009832546B2

United States Patent
Asao et al.

(10) Patent No.: US 9,832,546 B2
(45) Date of Patent: Nov. 28, 2017

(54) MONITORING SYSTEM FOR PHOTOVOLTAIC POWER GENERATION AND COMMUNICATION METHOD THEREFOR

(71) Applicant: Sumitomo Electric Industries, Ltd., Osaka-shi (JP)

(72) Inventors: Yoshihisa Asao, Osaka (JP); Takefumi Shimoguchi, Osaka (JP); Tomohisa Matsushita, Osaka (JP); Tetsuo Goto, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 69 days.

(21) Appl. No.: 14/665,654

(22) Filed: Mar. 23, 2015

(65) Prior Publication Data

US 2015/0271575 A1   Sep. 24, 2015

(30) Foreign Application Priority Data

Mar. 24, 2014  (JP) ................. 2014-060641

(51) Int. Cl.
*G08C 19/22* (2006.01)
*H04Q 9/00* (2006.01)
(Continued)

(52) U.S. Cl.
CPC ............... *H04Q 9/00* (2013.01); *H02S 50/10* (2014.12); *H04B 3/54* (2013.01); *H04B 2203/547* (2013.01); *H04B 2203/5433* (2013.01)

(58) Field of Classification Search
None
See application file for complete search history.

(56) References Cited

U.S. PATENT DOCUMENTS

| 8,719,477 B2 * | 5/2014 | Kaneko | G06F 13/376 710/110 |
| 2009/0159113 A1 * | 6/2009 | Morimoto | F24J 2/38 136/244 |
| 2014/0336784 A1 * | 11/2014 | Senda | G05B 19/4185 700/7 |

FOREIGN PATENT DOCUMENTS

| JP | 2001-313595 A | 11/2001 |
| JP | 2012-205061 A | 10/2012 |

(Continued)

*Primary Examiner* — Brian Zimmerman
*Assistant Examiner* — Thomas McCormack
(74) *Attorney, Agent, or Firm* — Venable LLP; Michael A. Sartori; Laura G. Remus

(57) ABSTRACT

This monitoring system for photovoltaic power generation includes: a first to n-th power collecting systems each for supplying a power conditioner with collected outputs from plural photovoltaic panels via a connection box; slave devices provided for connection boxes respectively belonging to the first to n-th power collecting systems, each slave device collecting measurement information about power generation and transmitting the collected measurement information by use of a direct current electrical path of the power collecting system thereof; a master device provided at a power collection end on an inlet side of the power conditioner to obtain the measurement information; a system selection unit for selecting one power collecting system upon reception of a selection signal from the master device and causing power line communication to be performed by use of a direct current electrical path of the selected power collecting system; and a monitoring device connected to the master device.

4 Claims, 5 Drawing Sheets

(51) Int. Cl.
*H04B 3/54* (2006.01)
*H02S 50/10* (2014.01)

(56) References Cited

FOREIGN PATENT DOCUMENTS

| | | |
|---|---|---|
| JP | 2012-205078 A | 10/2012 |
| JP | 2013-122712 A | 6/2013 |

\* cited by examiner

MONITORING SYSTEM FOR PHOTOVOLTAIC POWER GENERATION AND COMMUNICATION METHOD THEREFOR

TECHNICAL FIELD

The present invention relates to a monitoring system to be used in photovoltaic power generation.

BACKGROUND ART

For example, in a so-called mega solar power station (large-scaled photovoltaic power station), a large number of photovoltaic panels are arranged. In the station, outputs from a predetermined number of photovoltaic panels are aggregated at a connection box. Then, the aggregated outputs are sent to a power conditioner (power conversion device) (see PATENT LITERATURE 1 (FIG. 1), for example).

On the other hand, in order to monitor whether a failure has occurred in any of photovoltaic panels, there have been proposed various technologies that transmit information of current/voltage outputted by the photovoltaic panels, by use of direct current power lines (see PATENT LITERATURE 1 to 3, for example). A typical transmission technology is power line communication (PLC). In a case where power line communication is used, voltage/current measuring devices and slave devices for power line communication are provided in each connection box, and each slave device transmits measurement information by use of a direct current electrical path, and a master device provided on the power conditioner side collects the measurement information.

CITATION LIST

Patent Literature

PATENT LITERATURE 1: Japanese Laid-Open Patent Publication No. 2012-205078
PATENT LITERATURE 2: Japanese Laid-Open Patent Publication No. 2012-205061
PATENT LITERATURE 3: Japanese Laid-Open Patent Publication No. 2013-122712

SUMMARY OF INVENTION

Technical Problem

As the configuration of power collecting systems extending from photovoltaic panels to a power conditioner, a variety of patterns exist. For example, there is a configuration where the power collecting systems exist independently of each other and are connected to the power conditioner without being integrated with each other. In such a case, it is necessary to connect one master device for power line communication to the direct current electrical paths of the power collecting systems, and to equally perform signal extraction/input among the respective direct current electrical paths.

However, in such a case, a power line communication signal is branched to be inputted, whereby signal attenuation is increased. This causes a problem that there may be a case where good communication cannot be performed. It is also possible to provide a master device for each power collecting system, but in this case, the number of master devices and the number of monitoring devices connected thereto are increased, which increases equipment costs.

In view of the above conventional problems, an object of the present invention is to provide a monitoring system for photovoltaic power generation in which good communication is performed with slave devices of a plurality of power collecting systems by means of a minimum number of master devices.

Solution to Problem

A monitoring system for photovoltaic power generation according to the present invention includes: a first to n-th power collecting systems in a case where a power collecting system in which outputs from a plurality of photovoltaic panels are collected via a connection box to be sent to a power conditioner is defined as one unit, with a natural number greater than or equal to 2 expressed as n; slave devices for power line communication respectively provided in association with connection boxes respectively belonging to the first to n-th power collecting systems, each slave device being configured to collect measurement information regarding power generation and configured to transmit the collected measurement information by use of a direct current electrical path of the power collecting system thereof; a master device for power line communication provided in association with a power collection end on an inlet side of the power conditioner, the master device being configured to obtain the measurement information; a system selection unit configured to alternatively select a power collecting system upon reception of a selection signal from the master device and configured to cause power line communication to be performed by use of a direct current electrical path of the selected power collecting system; and a monitoring device connected to the master device.

Moreover, the present invention is a communication method for a monitoring system for photovoltaic power generation, the monitoring system including: a first to n-th power collecting systems in a case where a power collecting system in which outputs from a plurality of photovoltaic panels are collected via a connection box to be sent to a power conditioner is defined as one unit, with a natural number greater than or equal to 2 expressed as n; slave devices for power line communication respectively provided in association with connection boxes respectively belonging to the first to n-th power collecting systems, each slave device being configured to collect measurement information regarding power generation and configured to transmit the collected measurement information by use of a direct current electrical path of the power collecting system thereof; a master device for power line communication provided in association with a power collection end on an inlet side of the power conditioner, the master device being configured to obtain the measurement information; and a monitoring device connected to the master device, wherein the master device performs power line communication in order in a time division manner with all the slave devices respectively belonging to the power collecting systems, while alternatively selecting a power collecting system.

Advantageous Effects of Invention

According to the monitoring system for photovoltaic power generation of the present invention and the communication method therefore, it is possible to perform good communication with slave devices of a plurality of power collecting systems in order, by use of a minimum number of master devices.

DESCRIPTION OF EMBODIMENTS

Summary of Embodiments

Figure 1:
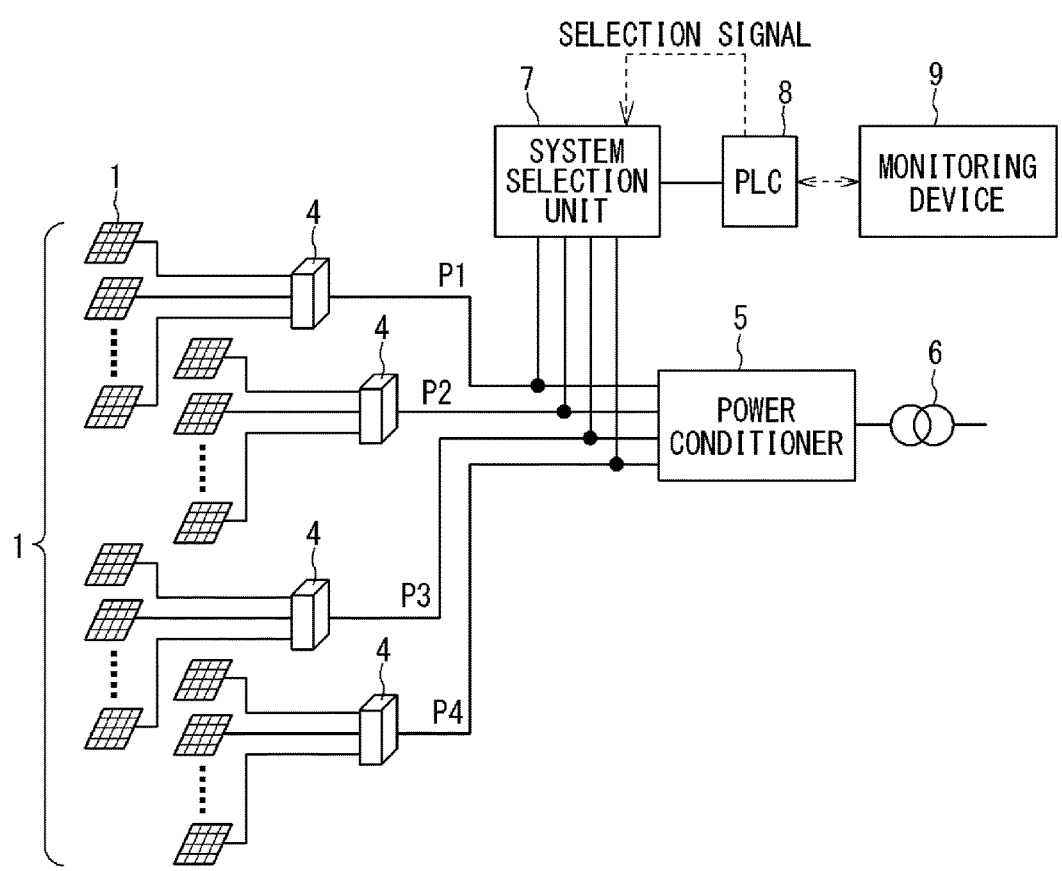
FIG. 1 is a one-line system diagram showing a first configuration example of a monitoring system for photovoltaic power generation according to one embodiment of the present invention.

The summary of embodiments of the present invention includes at least the following.

(1) This monitoring system for photovoltaic power generation includes: a first to n-th power collecting systems in a case where a power collecting system in which outputs from a plurality of photovoltaic panels are collected via a connection box to be sent to a power conditioner is defined as one unit, with a natural number greater than or equal to 2 expressed as n; slave devices for power line communication respectively provided in association with connection boxes respectively belonging to the first to n-th power collecting systems, each slave device being configured to collect measurement information regarding power generation and configured to transmit the collected measurement information by use of a direct current electrical path of the power collecting system thereof; a master device for power line communication provided in association with a power collection end on an inlet side of the power conditioner, the master device being configured to obtain the measurement information; a system selection unit configured to alternatively select a power collecting system upon reception of a selection signal from the master device and configured to cause power line communication to be performed by use of a direct current electrical path of the selected power collecting system; and a monitoring device connected to the master device.

In the monitoring system for photovoltaic power generation configured as (1) above, one power collecting system can be selected from among a plurality of power collecting systems, and by use of the direct current electrical path of the selected power collecting system, the master device can collect measurement information from the corresponding slave device. By sequentially changing a power collecting system to be selected, it is possible to collect measurement information from all the slave devices. Accordingly, it is possible to perform good communication with slave devices of the plurality of power collecting systems in order, by use of a minimum number of master devices.

(2) In the monitoring system for photovoltaic power generation of (1), the master device and the system selection unit may select, at a timing of polling, a power collecting system to which a slave device being a target of the polling belongs, and the slave device of the selected power collecting system may transmit the measurement information.

In this case, since measurement information arrives immediately after the timing of the polling, it is easy to manage collection of information from the viewpoint of the master device.

(3) In the monitoring system for photovoltaic power generation of (1), the master device and the system selection unit may select a power collecting system at a timing of one of time slots respectively defined for all the slave devices, and the slave device of the selected power collecting system may transmit the measurement information.

In this case, since measurement information is spontaneously and sequentially sent from the slave device side, it is possible to perform quicker information transmission. In addition, since each slave device knows its own transmission timing, when the time is not the transmission timing, the slave device can stop the transmission function, for example, to suppress power consumption.

(4) On the other hand, this aspect of the present invention is a communication method for a monitoring system for photovoltaic power generation, the monitoring system including: a first to n-th power collecting systems in a case where a power collecting system in which outputs from a plurality of photovoltaic panels are collected via a connection box to be sent to a power conditioner is defined as one unit, with a natural number greater than or equal to 2 expressed as n; slave devices for power line communication respectively provided in association with connection boxes respectively belonging to the first to n-th power collecting systems, each slave device being configured to collect measurement information regarding power generation and configured to transmit the collected measurement information by use of a direct current electrical path of the power collecting system thereof; a master device for power line communication provided in association with a power collection end on an inlet side of the power conditioner, the master device being configured to obtain the measurement information; and a monitoring device connected to the master device, wherein the master device performs power line communication in order in a time division manner with all the slave devices respectively belonging to the power collecting systems, while alternatively selecting a power collecting system.

In the communication method for a monitoring system for photovoltaic power generation of (4) above, the master device can collect measurement information from all the slave devices in a time division manner, while alternatively selecting a power collecting system. Accordingly, it is possible to perform good communication with slave devices of a plurality of power collecting systems in order, by use of a minimum number of master devices.

Details of Embodiments

First Configuration Example

FIG. 1 is a one-line system diagram showing a first configuration example of a monitoring system for photovoltaic power generation according to one embodiment of the present invention. It should be noted that the numbers of elements and configurations shown are merely examples.

In FIG. 1, the system includes power collecting systems P1 to P4. A predetermined number of direct current outputs from a large number of photovoltaic panels 1 are aggregated in each of four connection boxes 4. The output from each connection box 4 is sent to a power conditioner 5 to be converted into alternating current, and then, alternating current power can be provided to a commercial power system via a transformer 6.

Figure 2:
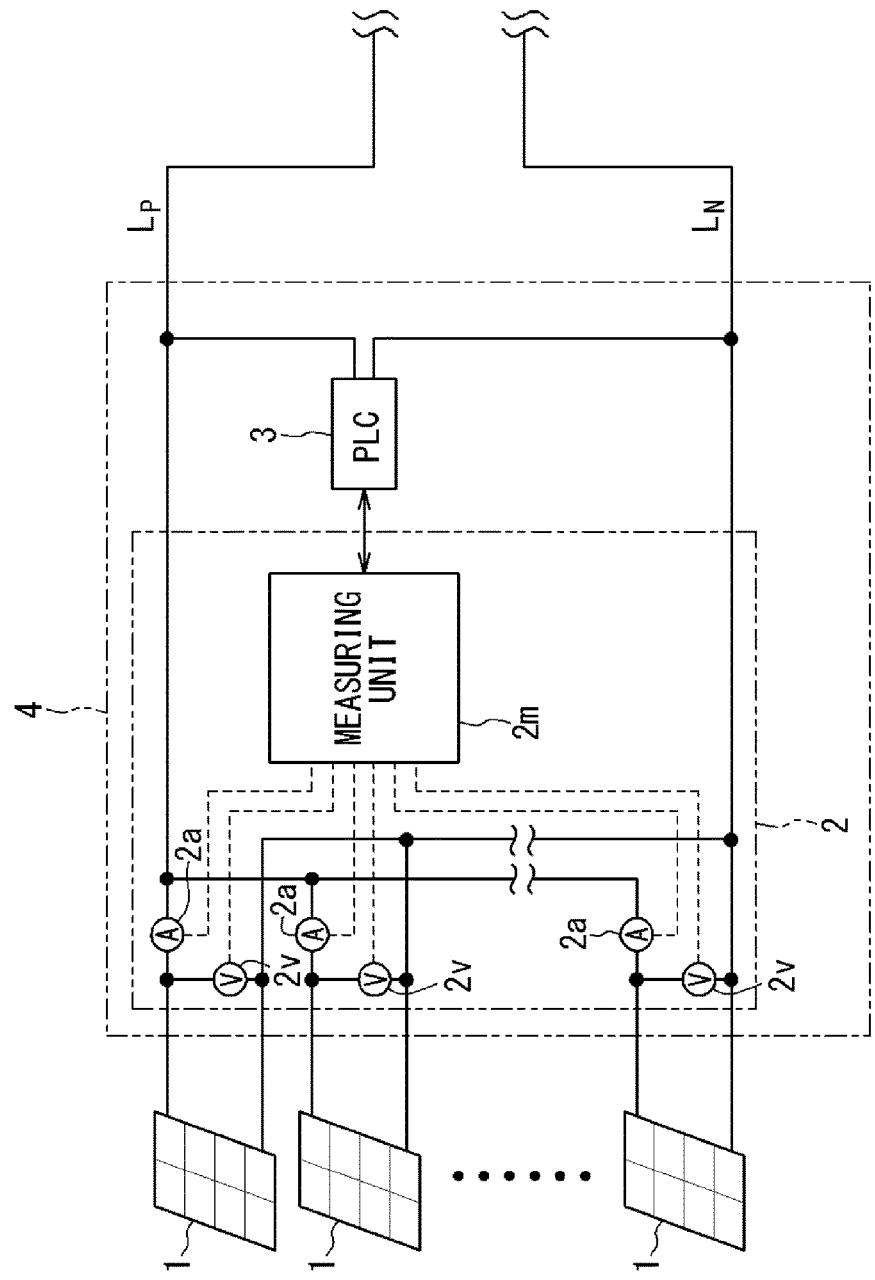
FIG. 2 is a circuit diagram showing one example of the internal configuration of a connection box shown in FIG. 1.

FIG. 2 is a circuit diagram showing one example of the internal configuration of the connection box 4. With reference to FIG. 2, inside the connection box 4, a measuring device 2 and a slave device for power line communication (hereinafter, referred to as PLC slave device) 3 are provided. The measuring device 2 includes, corresponding to each photovoltaic panel 1, a current sensor 2a which measures outputted current and a voltage sensor 2v which measures outputted voltage (however, in the case shown in FIG. 2, since the photovoltaic panels 1 are connected to each other in parallel, the voltage sensor 2v may be provided at one of the positions where the voltage sensor 2v would otherwise be provided). All outputs from the sensors are collected to a measuring unit 2m. The measuring unit 2m is communicably connected to the PLC slave device 3, and provides measurement information of voltage/current to the PLC slave device 3.

The PLC slave device 3 may not necessarily be provided inside the connection box 4, and may be provided in the vicinity of the connection box 4. That is, it is sufficient that the PLC slave device 3 is provided in association with the connection box 4.

The PLC slave device 3 is connected to direct current electrical paths $L_P$ and $L_N$, and transmits measurement information on the direct current electrical paths $L_P$ and $L_N$, through power line communication. The signal of the measurement information has a frequency band of 10 kHz to 450 kHz, for example, and reaches the inlet side of the power conditioner 5 (FIG. 1) being a power collection end.

With reference back to FIG. 1, to the direct current electrical paths extending from the connection boxes 4 to the power conditioner 5, a master device for power line communication (hereinafter, referred to as PLC master device) 8 is connected via a system selection unit 7. In addition, the PLC master device 8 is connected to a monitoring device 9 via LAN (Local Area Network) wiring, for example.

For example, the system selection unit 7 and the PLC master device 8 are housed in the same housing as that for the power conditioner 5, and thus, appear to be a part of the power conditioner 5. However, the system selection unit 7 and the PLC master device 8 need not necessarily be integrated with the power conditioner 5. That is, it is sufficient that the system selection unit 7 and the PLC master device 8 are provided in association with the power collection end (the inlet side of the power conditioner 5) of the power collecting systems P1 to P4.

The system selection unit 7 is a multiplexer, for example, and has a function of alternatively selecting a direct current electrical path that is to be connected to the PLC master device 8. A selection signal is provided by the PLC master device 8 to the system selection unit 7. Therefore, in the example of FIG. 1, the PLC master device 8 is to be connected to any one (actually, two lines, i.e., positive and negative lines) among four direct current electrical paths (in one-line expression) extending from the four connection boxes 4 to the power conditioner 5.

Second Configuration Example

Figure 3:
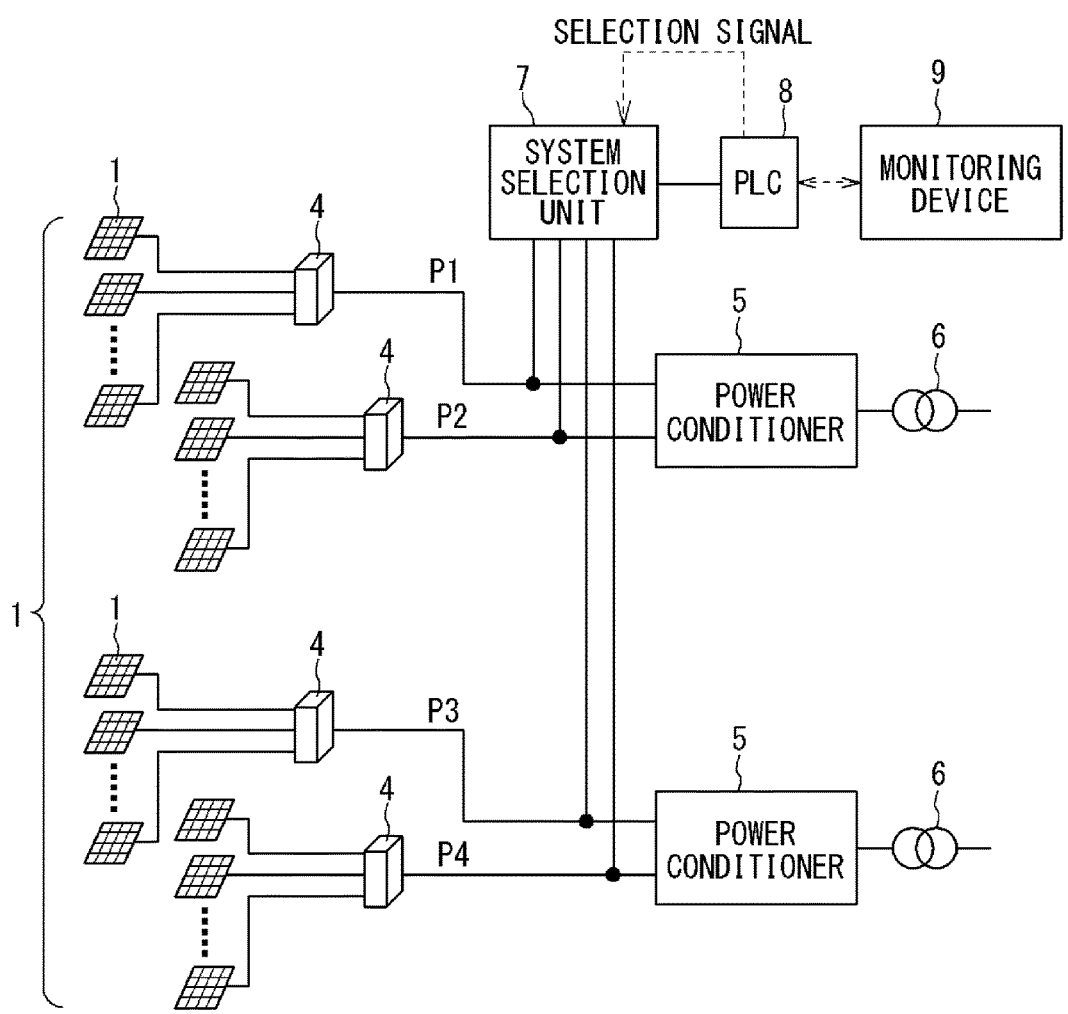
FIG. 3 is a one-line system diagram showing a second configuration example of a monitoring system for photovoltaic power generation according to one embodiment of the present invention.

FIG. 3 is a one-line system diagram showing a second configuration example of a monitoring system for photovoltaic power generation according to one embodiment of the present invention. It should be noted that the numbers of elements and configurations shown are merely examples.

In FIG. 3, this system includes the power collecting systems P1 and P2, and the power collecting systems P3 and P4, which collect power to two power conditioners 5, respectively. With respect to the power collecting systems P1 and P2, a predetermined number of direct current outputs from a large number of the photovoltaic panels 1 are aggregated in each of two connection boxes 4. The output from each connection box 4 is sent to its corresponding power conditioner 5 to be converted into alternating current, and then, alternating current power can be provided to a commercial power system via its corresponding transformer 6. The same applies to the power collecting systems P3 and P4.

To the direct current electrical paths extending from the connection boxes 4 to the power conditioners 5, the PLC master device 8 is connected via the system selection unit 7. In addition, the PLC master device 8 is connected to the monitoring device 9 via LAN wiring, for example.

Other configurations than the above are the same as those in the first configuration example (FIG. 1 and FIG. 2). That is, the difference of the second configuration example from the first configuration example is that the power collecting systems are largely divided into a group of P1 and P2 and a group of P3 and P4, and that each group is provided with the power conditioner 5.

Also in the second configuration example, the PLC master device 8 provides a selection signal to the system selection unit 7. Therefore, in the example of FIG. 3, the PLC master device 8 is to be connected to any one (actually, two lines, i.e., positive and negative lines) among the four direct current electrical paths (in one-line expression) extending from a total of four connection boxes 4 of the power collecting systems P1 to P4 to the power conditioners 5.

Now, a communication scheme (communication method) in the monitoring system for photovoltaic power generation as described above will be described. It should be noted that both of the first configuration example and the second configuration example can adopt the same communication scheme.

First Communication Scheme: Polling

Figure 4:
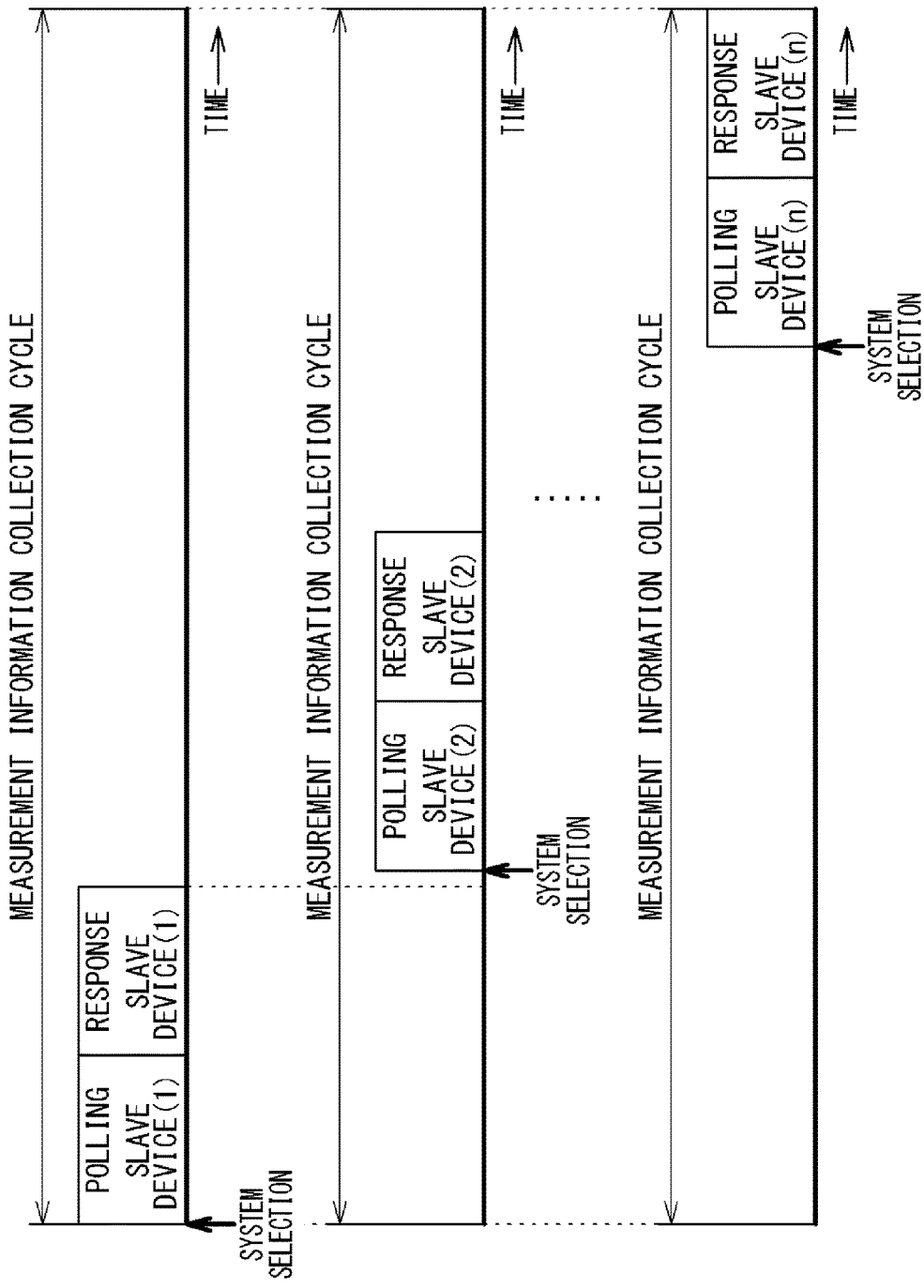
FIG. 4 shows the outline of a first communication scheme.

FIG. 4 shows the outline of a first communication scheme. Now, it is assumed that the total number of the connection boxes 4 is n, that the total number of the PLC slave devices 3 is also n, and that the order in which communication is performed is from a slave device (1) to a slave device (n), for example. Then, in FIG. 4, the PLC master device 8 first causes the system selection unit 7 to perform system selection such that the PLC master device 8 is connected to the direct current electrical path to which the slave device (1) belongs, and performs polling to the slave device (1). The slave device (1) having received the polling transmits measurement information as a response. Subsequently, the PLC master device 8 causes the system selection unit 7 to perform system selection such that the PLC master device 8 is connected to the direct current electrical path to which a slave device (2) belongs, and performs polling to the slave device (2). The slave device (2) having received the polling transmits measurement information as a response. Thereafter, in the same manner, the PLC master device 8 performs polling to up to the slave device (n), and obtains measurement information. Accordingly, in the cycle of collecting measurement information, the PLC master device 8 can obtain measurement information from all the slave devices (1) to (n). It should be noted that the order of polling can be freely set.

Thus, in the monitoring system for photovoltaic power generation adopting the first communication scheme, one power collecting system is selected from among a plurality of power collecting systems, and by use of the direct current electrical path of the selected power collecting system, the PLC master device 8 can collect measurement information from a PLC slave device 3 (any one of the slave devices (1) to (n)). By sequentially changing the power collecting system to be selected, it is possible to collect measurement information from all the PLC slave devices 3. Accordingly, it is possible to perform good communication with slave devices of the plurality of power collecting systems in order, by use of a minimum number of the PLC master devices 8.

In addition, since measurement information arrives immediately after the timing of the polling, it is easy to manage collection of information from the viewpoint of the PLC master device 8.

Second Communication Scheme: Calling From PLC Slave Device

Figure 5:
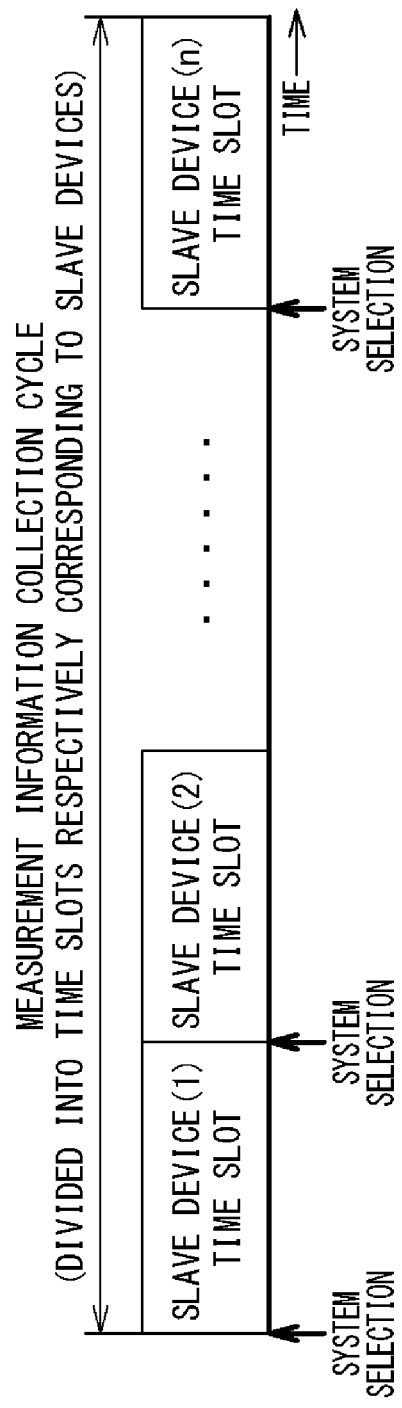
FIG. 5 shows the outline of a second communication scheme.

FIG. 5 shows the outline of a second communication scheme. It is assumed that the total number of the connection boxes 4 is n, that the total number of the PLC slave devices 3 is also n, and that the order in which communication is performed is from a slave device (1) to a slave device (n), for example. In the second communication scheme, time slots for the respective slave devices are equally set in advance in the measurement information collection cycle. This time slot schedule is shared by the PLC master device 8 and all the PLC slave devices 3 (the slave devices (1) to (n)), and is in time synchronization among them.

With reference to FIG. 5, in the time slot for the slave device (1), for example, the PLC master device 8 has caused the system selection unit 7 to perform system selection such that the PLC master device 8 is connected to the direct current electrical path to which the slave device (1) belongs. In that state, the slave device (1) transmits measurement information. Subsequently, the PLC master device 8 causes the system selection unit 7 to perform system selection such that the PLC master device 8 is connected to the direct current electrical path to which a slave device (2) belongs. In that state, the slave device (2) transmits measurement information. Thereafter, in the same manner, the subsequent slave devices up to the slave device (n) transmit measurement information, whereby the PLC master device 8 can obtain measurement information from all the slave devices (1) to (n) within the measurement information collection cycle. It should be noted that the order of the time slots can be freely set.

Thus, in the monitoring system for photovoltaic power generation adopting the second communication scheme, one power collecting system is selected from among a plurality of power collecting systems, and by use of the direct current electrical path of the selected power collecting system, the PLC master device 8 can collect measurement information from a PLC slave device 3 (any one of the slave devices (1) to (n)). By sequentially changing the power collecting system to be selected in accordance with the time slot schedule, it is possible to collect measurement information from all the PLC slave devices 3. Accordingly, it is possible to perform good communication with slave devices of the plurality of power collecting systems in order, by use of a minimum number of the PLC master devices 8.

In this case, since measurement information is spontaneously and sequentially sent from the slave device side, it is possible to perform quicker information transmission. In addition, since each slave device knows its own transmission timing, when the time is not the transmission timing, the slave device can stop the transmission function, for example, to suppress power consumption.

Summary and Others

It should be noted that the power collecting systems P1 to P4 shown in FIG. 1 or FIG. 3 are merely examples. In a case where a natural number greater than or equal to 2 is expressed as n, and a power collecting system in which outputs from a plurality of photovoltaic panels are collected via a connection box to be sent to a power conditioner is defined as one unit, the first to n-th power collecting systems can exist. In this case, each slave device is provided in association with a connection box belonging to its corresponding one of the first to n-th power collecting systems, collects measurement information regarding power generation, and transmits the collected measurement information by use of the direct current electrical path of its corresponding power collecting system. The master device is provided in association with the power collection end on the inlet side of the power conditioner, and obtains the measurement information. The system selection unit alternatively selects a power collecting system upon reception of a selection signal from the master device and causes power line communication to be performed by use of the direct current electrical path of the selected power collecting system.

In other words, each communication scheme described above is a communication method for a monitoring system for photovoltaic power generation in which the PLC master device 8 performs power line communication in order in a time division manner with all the slave devices respectively belonging to the power collecting systems, while alternatively selecting a power collecting system.

In the communication method for a monitoring system for photovoltaic power generation, the master device can collect measurement information from all the slave devices in a time division manner, while alternatively selecting a power collecting system. Accordingly, it is possible to perform good communication with slave devices of a plurality of power collecting systems in order, by use of a minimum number of master devices.

Additional Notes

It should be noted that the embodiment disclosed herein is merely illustrative in all aspects and should not be recognized as being restrictive. The scope of the present invention is defined by the scope of the claims and is intended to include meaning equivalent to the scope of the claims and all modifications within the scope.

REFERENCE SIGNS LIST

1 photovoltaic panel
2 measuring device
2a current sensor
2v voltage sensor
2m measuring unit
3 slave device (PLC slave device)
4 connection box
5 power conditioner
6 transformer
7 system selection unit
8 master device (PLC master device)
9 monitoring device $L_P$, $L_N$ direct current electrical path
P1 to P4 power collecting system

The invention claimed is:

1. A monitoring system for photovoltaic power generation, the monitoring system comprising:
plurality of power collecting systems, each power collecting system configured to collect outputs from a plurality of photovoltaic panels via a connection box and send to a power conditioner;
slave devices for power line communication respectively provided in association with connection boxes respectively belonging to the plurality of power collecting systems, each slave device being configured to collect measurement information regarding power generation of the plurality of photovoltaic panels belonging to the correspondent power collecting system from the electrical paths which are connected to the correspondent connection box and configured to transmit the collected measurement information by use of a direct current electrical path of the power collecting system from the correspondent connection box to the power conditioner;
a master device for power line communication provided in association with a power collection end on an inlet side of the power conditioner, the master device being configured to obtain the measurement information through power line communication with the slave devices by use of a direct current electrical path;
a system selection unit connected individually to each of the direct current electrical paths of the power collecting systems and configured to connect the slave device of an alternatively selected power collecting system to the master device via the direct current electrical path of the power collecting system, the system selection unit being configured to disconnect the master device from the direct current electrical path of a non-selected power collecting system; and
a monitoring device connected to the master device.

2. The monitoring system for photovoltaic power generation according to claim 1, wherein
the master device and the system selection unit select, at a timing of polling, a power collecting system to which a slave device being a target of the polling belongs, and the slave device of the selected power collecting system transmits the measurement information.

3. The monitoring system for photovoltaic power generation according to claim 1, wherein
the master device and the system selection unit select a power collecting system at a timing of one of time slots respectively defined for all the slave devices, and the slave device of the selected power collecting system transmits the measurement information.

4. A communication method for a monitoring system for photovoltaic power generation, the monitoring system including: a plurality of power collecting systems, each power collecting system configured to collect outputs from a plurality of photovoltaic panels via a connection box and send to a power conditioner; slave devices for power line communication respectively provided in association with connection boxes respectively belonging to the plurality of power collecting systems, each slave device being configured to collect measurement information regarding power generation of the plurality of photovoltaic panels belonging to the correspondent power collecting system from the electrical paths which are connected to the correspondent connection box and configured to transmit the collected measurement information by use of a direct current electrical path of the power collecting system from the correspondent connection box to the power conditioner; a master device for power line communication provided in association with a power collection end on an inlet side of the power conditioner, the master device being configured to obtain the measurement information through power line communication with the slave devices by use of a direct current electrical path; and a monitoring device connected to the master device, wherein
the master device connects in order in a time division manner with all the slave devices respectively belonging to the power collecting systems via the direct current electrical path of the power collecting system, while alternatively selecting a power collecting system, and the master device disconnects with the direct current electrical path of a non-selected power collecting system.

* * * * *